3,658,752
METHOD OF MAKING STABLE BLENDS OF CHEMICALLY DISSIMILAR ELASTOMERS AND PLASTICS
Balbhadra Das, Mogadore, and Daniel A. Meyer, Akron, Ohio, assignors to The General Tire & Rubber Company
No Drawing. Filed July 22, 1969, Ser. No. 843,816
Int. Cl. C08c *11/18;* C08d *9/08;* C08g *51/04*
U.S. Cl. 260—41.5 A                8 Claims

ABSTRACT OF THE DISCLOSURE

This invention concerns a method of making a stable blend of an elastomer and an incompatible plastic comprising fluxing the elastomer, the incompatible plastic, and a finely divided reinforcing particulate filler at a temperature above the softening point of the plastic and below the degradation temperature of the plastic and the elastomer.

BACKGROUND OF THE INVENTION

Field of the invention

This invention relates to the field of blends of elastomers and plastics. More particularly, this invention relates to blends of elastomers and incompatible plastics and to a method of achieving stability therein.

Description of the prior art

Polymeric materials are long chain molecules made from small monomeric subunits joined in various configurations, such as linear, branched, etc. The type of subunits, the mechanism by which they are joined, the degree of branching and other factors determine among other things the flexibility of the polymer (macromolecule).

If all polymeric substances, both natural and synthetic, are considered only as to their flexibility, they may be separated into two general groups known as elastomers and plastics. For the purpose of this classification, elastomers are considered to comprise the flexible polymers and plastics are considered to comprise the rigid polymers.

Virtually all polymers in their pure state do not possess sufficient chemical and physical properties for commercial utilization. For instance, pure gum synthetic rubber has a tensile strength less than 1000 p.s.i.; this is insufficient for most purposes. The rubber is usually strengthened by the addition of such materials as reinforcing carbon blacks and by processes such as vulcanization. By the same token, pure polystyrene is too brittle for many applications and, therefore, is usually made more flexible or impact resistant by blending with small amounts of rubbers such as polybutadiene and other elastomers.

Since both elastomers and plastics are separately modified to improve their physical properties, it follows that there are many instances where blends of elastomers and plastics are desirable. Blending of plastics and elastomers has heretofore been extremely limited because many plastics are incompatible with many elastomers. By "incompatible" is meant that a fluxed blend of solely the plastic and the elastomer becomes unstable when processed below its fluxing temperature. An unstable blend is one that either shows phase separation or remains visually homogeneous but displays poor physical properties.

Incompatibility of plastics and elastomers has been explained on the basis of polarity. As a general rule, polar elastomers are incompatible with nonpolar plastics and compatible with polar plastics and nonpolar elastomers are incompatible with polar plastics and compatible with nonpolar plastics.

Each atom and chemical group in a molecule imparts a distinct atomic force to its structural environment. Because different atoms and chemical groups are of different size, weight, number of components, etc., the atomic force each imparts to its structural neighbor is necessarily different. In plastic and elastomeric polymers there are different atoms and chemical groups purposely placed pendant to or as part of the polymer chains to achieve certain properties or to facilitate later utilization. Examples of these groups are carboxyl groups for crosslinking, hydroxyl groups to enhance water solubility, amine groups to allow chain extension, and unsaturation (double bonds) to provide vulcanization sites. The atomic forces imparted to the polymer chain by these dissimilar atoms and groups are generally called "dipole forces." The summation of these separate and different dipole forces resulting from the atoms and groups in the polymer chain determine the overall dipole characteristics or polarity of the polymer and greatly influence the behavior of that polymer with other polymers containing different amounts and types of atoms and chemical groups.

More specifically, polarity has been explained in terms of "cohesive energy density" (c.e.d.). This term is based upon a polymer's theoretical energy of evaporation and goes far to explain the intereffect of various polymers. A more useful term has been derived from cohesive energy density to indicate the degree of polarity of a polymer; this term is the "solubility parameter" ($\delta$) and is the square root of the c.e.d.

To illustrate the degree of polarity with regard to blends of elastomers and plastics, Table I is a list of some well-known polymers with their solubility parameters. In Table I, one may choose, for example, polybutadiene with its solubility parameter of 8.5. Note that polystyrene with a solubility parameter of 9.0 would be compatible on the basis of its relatively similar polarity and is in fact compatible with polybutadiene as evidenced by the well-known "high impact" polystyrene blends. Similarly, polypropylene with its solubility parameter of 9.3 is compatible with natural rubber ($\delta=8.15$), SBR rubber ($\delta=8.5$), and polyisobutylene ($\delta=8.05$). Conversely, however, polypropylene has a solubility parameter quite different from that of polyurethane ruber ($\delta=9.3$ versus $\delta=12.0$ respectively) and is in fact incompatible therewith. These latter two polymers may be fluxed at temperatures above the softening point of polypropylene (165° C.–170° C.), however, the blend is unstable below that temperature, i.e., it will either separate into phases upon processing at lower temperatures or will remain visually homogeneous and exhibit very poor physical properties.

TABLE I

| Polymers: | Solubility parameter "δ" in cal.½/cc.½ |
|---|---|
| Polytetrafluoroethylene | 6.2 |
| Polyisobutylene | 8.05 |
| EPDM rubber | 7.0 |
| Polythene | 7.9 |
| Natural rubber | 8.15 |
| Polybutadiene | 8.5 |
| SBR rubber | 8.5 |
| Polystyrene | 9.0 |
| Polymethyl methacrylate | 9.25 |
| Polychloroprene | 9.2 |
| Polypropylene | 9.3 |
| Polyvinyl acetate | 9.4 |
| Polyvinyl chloride | 9.6 |
| Polymethyl chloroacrylate | 10.1 |
| Cellulose dinitrate | 10.5 |
| Polymethacrylonitrile | 10.7 |
| Cellulose diacetate | 11.4 |
| Polyurethane rubber | 12.0 |
| Polyacrylonitrile | 12.75 |
| Nylon | 13.0+ |

This explanation of compatibility between various polymers is not totally consistent because of other forces operating on the macromolecule such as hydrogen bonding, ionic bonding, association, solvation, and others. However, these discrepancies are not of sufficient magnitude to prevent the solubility parameter concept from explaining most of the compatibilities between polymers.

Since virtually every polymer possesses its own inimitable characteristics, it follows that the ability to blend many polymers, both compatible and incompatible, will provide for a more wider utilization of polymers and provide better products. Heretofore, elastomers and plastics could only be blended on a "like vs. like" basis, i.e., polymers having relatively close solubility parameters. The prior art has developed a few methods usable in narrow instances for making stable blends from incompatible polymers (see U.S. 2,538,779, U.S. 2,614,089, U.S. 2,711,400, and U.S. 3,399,155).

This invention is based upon the discovery that stable blends of incompatible thermoplastics and elastomers may be made by fluxing the elastomer, the incompatible thermoplastic, and a finely divided reinforcing particulate filler together at a temperature above the softening point of the thermoplastic. Thereafter, the cooled blend is stable during processing, i.e., it will not separate into phases. In addition, the physical properties such as tensile strength, tensile modulus, tear strength, and flex resistance are generally improved, some of them improved synergistically above the summation of the properties of each component. While all of the physical properties are generally improved by this invention, not all of them are improved in all cases to a point better than that of the raw elastomer or raw plastic. However, by a judicious choice of plastics and elastomers, one may maximize almost any physical property desired, while at the same time, not encountering a serious deterioration of the other properties. For example, by a proper choice of elastomer and incompatible plastic and following the teachings of this invention, one may raise the tensile modulus of the blend synergistically above the summation of the tensile modulus attributable to each of the components. This synergistic increase in tensile modulus appears in both the uncured and the cured form of the elastomer-thermoplastic blend. In other cases one may, by a proper selection of polymers and utilizing the process of this invention, raise one property of the blend, such as the tensile strength, above the level of either component alone or above the level of merely a blend of the two (i.e., without the process of this invention); this latter case demonstrates the stabilizing effect this inventive process has on the normally unstable incompatible blend.

Therefore, the main object of this invention is a method of making stable blends of elastomers and incompatible thermoplastics. Other objects include a method of incorporating an incompatible thermoplastic into an elastomer or a thermoplastic into an incompatible elastomer by the use of a finely divided reinforcing filler; a method of blending a thermoplastic, an elastomer, and a filler whereby the various physical properties of the blend are improved and in some cases improved synergistically in excess of the additive physical properties of each component; a method of making a stable blend of an elastomer and an incompatible thermoplastic that is simple, inexpensive, that utilizes existing processing equipment, and that is amenable to semi-automatic and automatic processing.

SUMMARY OF THE INVENTION

This invention is a method of making a stable blend of an elastomer and an incompatible thermoplastic comprising fluxing the elastomer, the incompatible thermoplastic, and a finely divided reinforcing particulate filler at a temperature above the softening point of the thermoplastic and below the degradation temperature of the plastic and the elastomer.

DESCRIPTION OF THE PREFERRED EMBODIMENT

This invention is directed toward incompatible elastomers and plastics. It is not possible to delineate specific elastomers except in relation to specific thermoplastics and vice versa. Reference is made to Table 1 which shows those thermoplastics and elastomers that are incompatible with each other. Therefore, this invention includes elastomers and thermoplastics that are incompatible such as EPDM rubber and nylon, EPDM rubber and polyvinyl chloride, polyurethane rubber and polypropylene, and contemplates all elastomers and all incompatible thermoplastics.

Generally this invention comprises a single step process wherein the elastomer, the incompatible thermoplastic, and the finely divided reinforcing particulate filler are fluxed at a temperature above the softening point of the thermoplastic and below the degradation temperatures of the plastic and the elastomer. Thereafter, the cooled blend will remain stable during processing. The temperature at which the fluxing is conducted is limited only by the softening temperature of the thermoplastic and the degradation temperature of the thermoplastic and the elastomer. Quite logically, one need not go above the degradation temperature of either component to achieve the benefits of this invention. As will be described below, there are different ways to achieve this single step process and yet produce the same or similar stable blend.

As used herein, the term "fluxing" means the act of mixing together an elastomer and a plastic, either or both of which may contain dispersions or mixtures of other ingredients, at a temperature above the softening temperature of the plastic to form an intimate blend therebetween. Also, the term "fluxing" as used herein indicates that the intimate blend is homogeneous in composition, i.e., matter which is uniform throughout. In this art, however, it is recognized that a fluxed elastomer and plastic, no matter how thoroughly they have been mixed, will always show discrete domains of the two polymers when examined under high magnification. These domains, which are not visible to the unaided eye, may be of different shapes and sizes. The term "softening point" is to be taken to mean the general temperature at which the thermoplastic becomes soft and fluid, i.e., it will easily flow. Although it is recognized that thermoplastics are softened in different degrees, depending upon the temperature, there is a generally accepted softening temperature for most thermoplastic materials such as 90° to 115° C. for polyethylenes, 135° to 170° C. for polypropylene and 160° to 250° C. for polyamides (nylon).

In the preferred embodiment of this invention, the elastomer, the incompatible thermoplastic, and the finely divided reinforcing particulate filler are placed in a high shear mixer and operated at a temperature above the softening point of the thermoplastic and below the degradation temperature of the thermoplastic and the elastomer whereby the elastomer and the thermoplastic are fluxed and the filler is uniformly dispersed throughout. The high shear mixer may be any device capable of forming a homogeneous blend of the materials at a temperature at or above the softening point of the plastic. Examples of such conventional machines are masticators, mills, and Banbury mixers; the latter mixer is preferred because of its low operating cost, ease of use, uniformity of fluxing, etc.

The resultant material may thereafter be processed as in any polymer process such as, depending on the composition, extruding, molding, calendering, or further blending with other materials. Where the elastomer is the major component of the resultant material, this further processing may be conducted at lower temperatures; where the plastic is the major component, further processing should be conducted above the plastic's softening point. One of the main reasons in preferring this type of process is that the finely divided reinforcing particulate filler is simultaneously exposed to the two polymer phases, elastomer and thermoplastic, and, by this simultaneous exposure, will uniformly and efficiently disperse in and couple with both phases. In this preferred embodiment, the elastomer may be introduced into the mixer as strips or chunks of raw elastomer and the thermoplastic may be introduced in pellet, powder, or chunk form. The finely divided reinforcing filler is usually in the form of a fine powder or small agglomerates called "pellets" and is introduced into the mixer as such.

In a second and preferred embodiment of this invention, the elastomer and the incompatible thermoplastic are introduced into the mixer and fluxed. Thereafter the finely divided reinforcing particulate filler is added and the fluxing continued at a temperature above the softening point of the thermoplastic and below the degradation temperature of the thermoplastic and the elastomer to disperse the filler therein. This embodiment is also preferred because the finely divided reinforcing particulate filler is simultaneously exposed to the two polymer phases and will uniformly and efficiently disperse in and couple with both phases.

In a third embodiment of this invention, the elastomer and the finely divided reinforcing particulate filler are introduced into a mixer and mixed (such as by dry blending the two components in a mixer or by dispersing the filler in the elastomer on a mill, masticator, Banbury mixer, etc.). Thereafter, the incompatible thermoplastic is introduced and all three components fluxed at a temperature above the softening point of the thermoplastic and below the degradation temperature of the thermoplastic and the elastomer. In this embodiment, the finely divided reinforcing filler is initially exposed to one (elastomer) phase and becomes fully surrounded and/or coated therewith. Upon introduction and fluxing of the second (thermoplastic) phase the filler particles may migrate into the thermoplastic phase only by first migrating out of the elastomer phase. Compared to the preferred embodiments, where the filler is simultaneously exposed to and dispersed in both phases, the efficiency of the filler in stabilizing the blend in this third embodiment is lowered by the impairment to filler migration due to the separate introduction of the polymers. Although the finely divided reinforcing filler will provide stability to the blend in this embodiment, the stabilizing efficiency will not be to the degree attained in the preferred embodiments and for this reason this third embodiment is not the preferred embodiment.

In a fourth embodiment of this invention, the thermoplastic and the finely divided reinforcing filler are first introduced into the mixer and mixed (such as by dry blending the two components in a mixer or by softening the thermoplastic and dispersing the filler therein on a mill or in a Banbury mixer, etc.). Thereafter the elastomer is introduced and all three components fluxed at a temperature above the softening point of the thermoplastic and below the degradation temperature of the thermoplastic and the elastomer. For the reasons given above in the less preferred embodiment, i.e., the impairment to migration of the filler into the last added polymer phase, the stabilizing efficiency of the finely divided reinforcing particulate filler in this fourth embodiment will be concomitantly lower than that of the preferred embodiments.

Finely divided reinforcing particulate fillers, for use in this invention, are well-known in the elastomer art. They comprise very fine particulate material, e.g., 7 to 75 millimicrons (m$\mu$) (mean) particle diameter having an "active" surface, i.e., a high surface area per unit weight, e.g., 40 to 400 square meters per gram (m.$^2$/gm.) and a profusion of active chemical groups such as carboxyl, carbonyl, hydroxyl, and various others. Typical of these finely divided reinforcing particulate fillers are anhydrous silicas and silicates, hydrated silicas and silicates, channel carbon blacks, and furnace carbon blacks. Many of these fillers are well-known in the art, see for example, Fine Particle Reinforcing Silicas and Silicates in Elastomers, Bachmann et al., Rubber Chemistry and Technology 32, 1286–1391 (1959) and Reinforcement of Elastomers, edited by Gerard Kraus, Interscience Publishers (1965). Specifically contemplated in this invention are silicas such as Cab-O-Sil® fumed silica type EH–5 having a mean particle diameter of 7 m$\mu$ and a surface area of 390±40 m.$^2$/gm., and Statex® (ISAF) carbon black type 125 having a mean particle diameter of 20 m$\mu$ and a surface area of 105–128 m.$^2$/gm.

The amount of finely divided reinforcing particulate filler added to the elastomer and incompatible thermoplastic may vary widely from about 3 parts (by weight) per 100 parts of rubber to greater than 50 parts. Below about 3 parts there is generally insufficient stability achieved between the elastomer and the incompatible thermoplastic. Amounts of filler in excess of 50 parts may be used to achieve stability, however, usually above about this level, other physical properties of the elastomer-thermoplastic blend begin to level off to where the stability of the blend becomes of secondary importance.

After the three components have been fluxed at a temperature above the softening point of the thermoplastic and below the degradation temperature of the thermoplastic and the elastomer, no other steps need be taken to stabilize it for it is now a stable blend. The blend may be thereafter cooled in any manner conventional in the art and further processed as desired.

After cooling, the uncured homogeneous blend remains stable. At this point, the physical properties are improved over those of merely a blend of the elastomer and the thermoplastic, (i.e., without the process of this invention), and, in some cases, one or more of the physical properties such as the tensile modulus, is improved synergistically above the summation of the tensile modulus attributable to each of the components. Such a feature is highly desirable because the additional strengthening is gained with a very little increase in material and processing cost.

The cooled stable blend may thereafter be cured in conventional ways well-known in the art such as by blending curing systems therein and by applying heat thereto. In this later (cured) form, the increased tensile modulus of the blend is increased even further over the summation of the modulus of elasticity of each of the cured component pairs. This meritorious feature of the invention provides an obvious economical benefit in the use of these stabilized blends by allowing the blend to be diluted with fillers and still retain desired physical properties.

The following examples are given to show the efficacy of the invention, the wide range of elastomer-thermoplastic blends that may benefit therefrom, the range of finely divided reinforcing particulate filler that may be utilized therein, and the simplicity and ease in which the process may be accomplished. These examples are given to show one skilled in the art how to practice the invention and are not to be construed either singly or in combination as placing a limitation thereon. All ingredients are shown in parts by weight per 100 parts by weight of rubber unless specified otherwise. All footnotes appear at the end of Example 7.

EXAMPLE 1

Polyurethane rubber (Genthane-S [1]) was fluxed with polypropylene (Escon 103 [2]) into blends (samples) A through F shown below in Table 1. When blended with polypropylene and/or finely divided reinforcing particulate filler, the rubber and polypropylene (and/or filler) were fluxed in a Banbury mixer at 350° F. The blends were then placed on a 250° F. mill and a curing system (Dicup 40C [3] and stearic acid) blended therein. The blends were then cured at 310° F. for 45 minutes, cut into test strips, and the physical properties of each determined. The ingredients and physical properties are shown below in Table 1. The value "$M_{100}$" is the tensile stress (or tensile modulus) of the blends measured at 100% elongation; it is later referred to as the $M_{100}$ modulus of the blend.

TABLE 1

|  | A | B | C | D | E | F |
|---|---|---|---|---|---|---|
| Ingredients: |  |  |  |  |  |  |
| Genthane-S [1] | 100 | 100 | 100 | 100 | 100 | 100 |
| Escon 103 [2] |  | 25 |  | 25 |  | 25 |
| Carbon black (ISAF) |  |  | 25 | 25 |  |  |
| Cab-O-Sil [4] |  |  |  |  | 25 | 25 |
| Stearic acid | 0.2 | 0.2 | 0.2 | 0.2 | 0.2 | 0.2 |
| Dicup 40C [3] | 5.0 | 5.0 | 5.0 | 5.0 | 5.0 | 5.0 |
| Properties: |  |  |  |  |  |  |
| $M_{100}$ modulus (p.s.i.) | 225 | 250 | 325 | 2,000 | 275 | 2,150 |
| Tensile strength (p.s.i.) | 17,50 | 250 | 5,650 | 3,100 | 5,250 | 2,400 |
| Elongation (percent) | 510 | 220 | 570 | 380 | 590 | 220 |
| Tensile set (percent) | 3.1 | 3.1 | 3.1 | 25 | 3.1 | 21.8 |
| Hardness (Shore A) | 54 | 70 | 64 | 83 | 69 | 85 |
| Stability | (a) | (b) | (a) | (a) | (a) | (a) | a Stable. b Unstable.

NOTE: See footnotes in col. 12.

Sample B separated into agglomerated phases when cooled to room temperature but it was tested anyway and the physical properties reported. The rubber blends containing polypropylene and finely divided reinforcing particulate fillers (ISAF carbon black and Cab-O-Sil® silica) remained stable when cooled (samples D and F); samples A, C, and E are only single polymers.

The following features of this invention may be noted from an observation of the reported physical properties:

(a) In the absence of the finely divided reinforcing particulate fillers, the polyurethane rubber/polypropylene blend (sample B) does not show a noticeable improvement in $M_{100}$ modulus over that of the raw stock (sample A): $M_{100}$ change from 225 to 250 p.s.i. Conversely, however, with finely divided reinforcing particulate fillers there is more than a six-fold increase in $M_{100}$ compared to the respective filler-filled samples: $M_{100}$ change from 325 to 2000 p.s.i. in the case of carbon black (samples C and D) and $M_{100}$ change from 275 to 2150 p.s.i. in the case of silica (samples E and F). Increases in other physical properties such as tensile strength, elongation, and hardness may be readily noted.

(b) The increased $M_{100}$ modulus of the polyurethane rubber/polypropylene blend, with the finely divided reinforcing particulate fillers is greater than the summation of the tensile moduli of the individual component pairs: the $M_{100}$ of the polyurethane rubber (sample A) is 225 p.s.i. and the corresponding values for the carbon black filled and the polypropylene-filled blends is 325 p.s.i. (sample C) and 250 p.s.i. (sample B) respectively. If the modulus-raising contribution of the polypropylene (sample B–sample A), or 250 p.s.i.–225 p.s.i.=25 p.s.i., be added to the carbon black-filled compound, 325 p.s.i. (sample C), then the corresponding modulus of the carbon black-filled blend (sample D) would be 350 p.s.i. However, the $M_{100}$ value of the polyurethane rubber/polypropylene/carbon black blend (sample D) is 2000 p.s.i. This constitutes clear proof of the synergistic increase in modulus occasioned by the incorporation of finely divided reinforcing particulate filler in accordance with the teachings of this invention.

(c) A similar synergistic effect is noted in the case of silica filler. Where the $M_{100}$ polyurethane rubber (sample A) is 225 p.s.i. the corresponding values for the silica-filled and polypropylene-filled blends are 275 p.s.i. (sample E) and 250 p.s.i. (sample B). If the modulus-raising contribution of the polypropylene (sample B–sample A), or 250 p.s.i.–225 p.s.i.=25 p.s.i., be added to the silica-filled compound, 275 p.s.i. (sample E), then the corresponding modulus of the silica-filled blend (sample F) would be 300 p.s.i. However, the $M_{100}$ value of the polyurethane rubber/polypropylene/silica blend (sample F) is 2150 p.s.i.

(d) The polyurethane rubber/polypropylene blend was not stable when cooled and processed at a lower temperature whereas the polyurethane rubber/polypropylene/filler blends were stable.

EXAMPLE 2

EPDM rubber (Nordel 1040 [5]) was fluxed with nylon (Zytel 63 and Zytel 69 [6]) blends (samples) A through H shown below in Table 2. When blended with nylon and/or finely divided reinforcing particulate fillers, the rubber and nylon (and/or filler) were fluxed in a Banbury mixer at 300° F. The blends were then placed on a 250° F. mill and a curing system (Dicup 40C [3]/sulfur/zinc oxide/stearic acid) blended therein. The blends were then cured at 320° F. for 45 minutes, cut into test strips, and the physical properties of each determined. The ingredients and physical properties are shown below in Table 2.

TABLE 2

|  | A | B | C | D | E | F | G | H |
|---|---|---|---|---|---|---|---|---|
| Ingredients: |  |  |  |  |  |  |  |  |
| Nordel 1040 [5] | 100 | 100 | 100 | 100 | 100 | 100 | 100 | 100 |
| Zytel 63 [6] |  |  |  | 25 |  | 25 | 25 |  |
| Zytel 69 [6] |  |  | 25 |  |  |  |  | 25 |
| Carbon black (ISAF) |  | 45 | 45 | 45 |  |  |  |  |
| Cab-O-Sil [4] |  |  |  |  | 45 | 45 |  |  |
| Calcium stearate | 1.0 | 1.0 | 1.0 | 1.0 | 1.0 | 1.0 | 1.0 | 1.0 |
| Zinc oxide | 5.0 | 5.0 | 5.0 | 5.0 | 5.0 | 5.0 | 5.0 | 5.0 |
| Dicup 40C [3] | 12.4 | 12.4 | 12.4 | 12.4 | 12.4 | 12.4 | 12.4 | 12.4 |
| Sulfur | 0.71 | 0.71 | 0.71 | 0.71 | 0.71 | 0.71 | 0.71 | 0.71 |
| Properties: |  |  |  |  |  |  |  |  |
| $M_{100}$ modulus (p.s.i.) | 125 | 425 | 550 | 860 | 225 | 525 | Discard | Discard |
| Tensile strength (p.s.i.) | 150 | 2,275 | 2,250 | 2,500 | 2,350 | 2,000 | Discard | Discard |
| Elongation (percent) | 270 | 250 | 27 | 250 | 560 | 400 | Discard | Discard |
| Tensile set (percent) | 0 | 0 | 12.5 | 12.5 | 15.6 | 34.3 | Discard | Discard |
| Hardness (Shore A) | 44 | 64 | 74 | 80 | 71 | 77 | Discard | Discard |
| Stability | (a) | (a) | (a) | (a) | (a) | (a) | (b) | (b) | a Stable. b Unstable.

NOTE: See footnotes in col. 12.

The blends of EPDM rubber and nylon without filler (samples G and H) separated into agglomerated phases upon cooling and continued milling and were discarded. The other blends remained stable under these conditions.

The following features of this invention may be noted from an observation of the reported physical properties:

(a) The $M_{100}$ moduli of the stable, homogeneous blends of Zytel 63 nylon (samples D and F) and Zytel 69 nylon (sample C), are significantly above those of both the EPDM rubber (sample A) and the EPDM rubber/filler blend (samples B and E): $M_{100}$ of 860 p.s.i., 525 p.s.i., and 550 p.s.i. vs. $M_{100}$ of 125 p.s.i., 425 p.s.i., and 225 p.s.i. respectively (b) The EPDM rubber/nylon blends were not stable when cooled and processed at a lower temperature whereas the EPDM rubber/nylon/filler blends were stable.

EXAMPLE 3

Butyl rubber (215)[7] was fluxed with nylon (Zytel 69) into blends (samples) A through D shown below in Table 3. When blended with nylon, and/or finely divided reinforcing particulate fillers, the rubber and nylon (and/or filler) were fluxed in a Banbury mixer at 300° F. The blends were then placed on a 250° F. mill and a curing system (MBTS [8]/sulfur/zinc oxide/stearic acid) blended therein. The blends were then cured at 307° F. for 40 minutes, cut into test strips, and the physical properties of each determined. The ingredients and physical properties are shown below in Table 3.

TABLE 3

|  | A | B | C | D |
|---|---|---|---|---|
| Ingredients: |  |  |  |  |
| Butyl rubber (215)[7] | 100 | 100 | 100 | 100 |
| Zytel 69 [6] |  |  | 25 | 25 |
| Carbon black (ISAF) |  | 25 | 25 |  |
| Stearic acid | 1.0 | 1.0 | 1.0 | 1.0 |
| Zinc oxide | 5.0 | 5.0 | 5.0 | 5.0 |
| MBTS [8] | 0.5 | 0.5 | 0.5 | 0.5 |
| Sulfur | 2.0 | 2.0 | 2.0 | 2.0 |
| Properties: |  |  |  |  |
| $M_{100}$ (p.s.i.) | 125 | 175 | 300 | Discard |
| Tensile strength (p.s.i.) | 200 | 2,425 | 1,600 | Discard |
| Elongation (percent) | 340 | 600 | 520 | Discard |
| Tensile set (percent) | 3.1 | 28.1 | 37.5 | Discard |
| Hardness (Shore A) | 34 | 54 | 62 | Discard |
| Stability | (a) | (a) | (a) | (b) |

[a] Stable.
[b] Unstable.

NOTE: See footnotes in col. 12.

The following features of this invention may be noted from an observation of the reported physical properties:

(a) The $M_{100}$ modulus of the stable, homogeneous blends containing nylon (sample C) is significantly above those of both the butyl rubber (sample A) and the butyl rubber/carbon black filler blend (sample B): $M_{100}$ of 300 p.s.i. vs. $M_{100}$ of 125 p.s.i. and 175 p.s.i. respectively.

(b) The butyl rubber/nylon blend was not stable when cooled and processed at a lower temperature whereas the butyl rubber/nylon/filler blend was stable.

EXAMPLE 4

SBR rubber (Gentro-1500)[9] was fluxed with heat stabilized* polyvinyl chloride resin (Vygen 110)[10] into blends (samples) A through D shown below in Table 4. When blended with polyvinyl chloride and/or finely divided reinforcing particulate fillers, the rubber and polyvinyl chloride (and/or filler) were fluxed in a Banbury mixer at 300° F. The blends were then placed on a 250° F. mill, a curing system (zinc oxide/sulfur/magnesium oxide/Santocure [12]/stearic acid) and antioxidants (PBNA [11]) blended therein. The blends were then cured at 300° F. for 30 minutes, cut into test strips, and the tensile modulus measured at different elongations (100 is 100% elongation) at 2 inches/minute tension rate. These values are shown below in Table 4.

TABLE 4

|  | A | B | C | D |
|---|---|---|---|---|
| Ingredients: |  |  |  |  |
| Gentro-1500 [9] | 100 | 100 | 100 | 100 |
| Vygen 110 [10] |  |  | 25 | 25 |
| Carbon black (ISAF) |  | 45 |  | 45 |
| Stearic acid | 1.0 | 1.0 | 1.0 | 1.0 |
| Zinc oxide | 3.0 | 3.0 | 3.0 | 3.0 |
| Sulfur | 1.8 | 1.8 | 1.8 | 1.8 |
| Magnesium oxide | 5.0 | 5.0 | 5.0 | 5.0 |
| PBNA [11] | 1.0 | 1.0 | 1.0 | 1.0 |
| Santocure [12] | 1.2 | 1.2 | 1.2 | 1.2 |
| Physical properties: |  |  |  |  |
| $M_{50}$ modulus (p.s.i.) | 72 | 169 | 110.5 | 289 |
| $M_{100}$ modulus (p.s.i.) | 106.5 | 259 | 141.0 | 505 |
| $M_{150}$ modulus (p.s.i.) | 133 | 400 | 164.5 | 795 |
| $M_{200}$ modulus (p.s.i.) | 149 | 635 | 188 | 1,035 |
| $M_{250}$ modulus (p.s.i.) | 173 | 940 | 211 | 1,278 |
| $M_{300}$ modulus (p.s.i.) | 186.5 | 1,290 | 236 | 1,520 |

NOTE: See footnotes in col. 12.

*Three parts of Ferro® 1827 (Ba, Cd, Sn stabilizer), Ferro Corporation.

The following features of this invention may be noted from an observation of the reported physical properties:

(a) In the absence of the finely divided reinforcing particulate fillers, the SBR rubber/polyvinyl chloride blend (sample C) shows only a modest improvement in $M_{50}$ modulus over that of the raw stock (sample A): $M_{50}$ change from 72 to 110.5 p.s.i. With finely divided reinforcing particulate fillers there is more than a two-fold increase in $M_{50}$:$M_{50}$ change from 110.5 to 289 p.s.i.

(b) The increased modulus of the SBR/polyvinyl chloride blend, with the finely divided reinforcing particulate fillers, is greater than the summation of the moduli of the individual component pairs. The $M_{50}$ of the SBR rubber (sample A) is 72 and the corresponding values for the carbon black-filled and the PVC-filled blends are 169 p.s.i. (sample B) and 110.5 p.s.i. (sample C) respectively. If the modulus-raising contributions of the PVC (sample C–sample A), or 110.5 p.s.i.–72 p.s.i.=38.5 p.s.i., be added to the carbon black-filled compound, 169 p.s.i. (sample B), then the corresponding modulus of the SBR rubber/polyvinyl chloride/carbon black blend (sample D) would be 207.5 p.s.i. However, the $M_{50}$ value of sample D) is 289 p.s.i. This constitutes clear proof of the synergistic increase in strength occasioned by the incorporation of finely divided reinforcing particulate fillers in accordance with the teachings of this invention.

EXAMPLE 5

EPDM rubber (Nordel 1040)[5] was fluxed with heat stabilized* polyvinyl chloride resin (Vygen 110)[10] into blends (samples) A through D shown below in Table 5. When blended with polyvinyl chloride and/or finely divided reinforcing particulate fillers, the rubber and PVC (and/or filler) were fluxed in an Banbury mixer at 300° F. The blends were then placed on a 250° F. mill and a curing system (zinc oxide/sulfur/magnesium oxide/MBT [13]/Thionex [14]/stearic acid) blended therein. The blends were then cured at 320° F. for 20 minutes, cut into test strips, and the modulus measured at different elongation as in Example 4. The ingredients and physical properties are shown below in Table 5.

TABLE 5

|  | A | B | C | D |
|---|---|---|---|---|
| Ingredients: |  |  |  |  |
| Nordel 1040 [5] | 100 | 100 | 100 | 100 |
| Vygen 110 [10] |  |  | 25 | 25 |
| Carbon black (ISAF) |  | 45 |  | 45 |
| Calcium stearate | 1.0 | 1.0 | 1.0 | 1.0 |
| Zinc oxide | 5.0 | 5.0 | 5.0 | 5.0 |
| Magnesium oxide | 5.0 | 5.0 | 5.0 | 5.0 |
| MBT [13] | 0.5 | 0.5 | 0.5 | 0.5 |
| Thionex [14] | 1.5 | 1.5 | 1.5 | 1.5 |
| Sulfur | 1.5 | 1.5 | 1.5 | 1.5 |
| Properties: |  |  |  |  |
| $M_{50}$ modulus (p.s.i.) | 89.2 | 205 | 103.5 | 266 |
| $M_{100}$ modulus (p.s.i.) | 116 | 282 | 123.5 | 342 |
| $M_{150}$ modulus (p.s.i.) | 132 | 398 | 126 | 455 |
| $M_{200}$ modulus (p.s.i.) |  | 607 | 130.5 | 620 |

The following features of this invention may be noted from an observation of the reported physical properties:

(a) In the absence of the finely divided reinforcing particulate fillers, the EPDM rubber/polyvinyl chloride blend (sample C) shows only a small improvement in $M_{50}$ modulus over that of the raw stock (sample A): $M_{50}$ change from 89.2 to 103.5 p.s.i. With finely divided reinforcing particulate fillers there is more than a two-fold increase in $M_{50}$:$M_{50}$ change from 103.5 to 266 p.s.i.

(b) The increased modulus of the EPDM rubber/polyvinyl chloride blend, with the finely divided reinforcing particulate fillers, is greater than the summation of the moduli of the individual component pairs. The $M_{50}$ of the EPDM rubber is 89.2 p.s.i. (sample A) and the corresponding values for the carbon black-filled and the polyvinyl chloride-filled blends are 205 p.s.i. (sample B) and 103.5 (sample C) respectively. If the modulus-raising

*Three parts Ferro® 1827 (Ba, Cd, Sn stabilizer) Ferro Corporation.

contribution of the PVC (sample C–sample A), or 103.5 p.s.i.–89.2 p.s.i.=14.3 p.s.i., be added to the carbon black-filled compound, 205 p.s.i. (sample B), then the corresponding modulus of the EPDM rubber/polyvinyl chloride/carbon black blend (sample D) would be 219.3 p.s.i. However, the $M_{50}$ value of sample D is 266 p.s.i. This constitutes clear proof of the synergistic increase in stiffness occasioned by the incorporation of finely divided reinforcing particulate fillers in accordance with the teachings of this invention.

EXAMPLE 6

EPDM rubber (Nordel 1042)[5], polyvinyl chloride resin (Vygen 110)[10], were fluxed into blends (samples) A through H shown below in Table 6. The rubber, resin, and filler were fluxed in a Banbury at 300° F. Part of the fluxed blend was then placed on a 250° F. mill where a curing system (sulfur/MBT/methyl tuads[15]) was blended therein. The EPDM: PVCPVC ratio was held constant in all blends at 50:50 by volume; the filler was also measured on a "parts by volume" basis in this example. The blends were then subjected to a heat treatment (curing for those blends containing the curing system) of 3 minutes at 350° F. The tensile strength of each blend was then measured. The ingredients and tensile strengths are shown below in Table 6.

crease in tensile strength due to the incorporation of silica. Similarly, the blend of EPDM/PVC: 70/30 should show a 208% increase from 200 p.s.i. to 417 p.s.i. whereas the actual reported tensile strength is synergistically higher— at 450 p.s.i. Likewise in the case of the blend of EPDM/ PVC: 50/50 the 208% increase would be 678 p.s.i. whereas the actual reported tensile strength is 925 p.s.i. This constituttes clear proof of the synergistic increase in modulus occasioned by the incorporation of finely divided reinforcing particulate fillers in accordance with the teachings of this invention.

FOOTNOTES

[1] Genthane–S—Polyurethane elastomer, The General Tire and Rubber Company.
[2] Escon 103—Polypropylene plastic, Enjay Chemical Co.
[3] Dicup 40C—Dicumyl peroxide on ppt calcium carbonate, Hercules, Inc.
[4] Cab-O-Sil—Fumed silica, Cabot Corp.
[5] Nordel 1040 and 1042—EPDM polymer, E. I. du Pont de Nemours & Co., Inc.
[6] Zytel 63 and 69—Nylon, E. I. du Pont de Nemours & Co., Inc.
[7] Butyl 215—Butyl elastomer, Enjay Chemical Co.
[8] MBTS—2,2'-benzothiazyl disulfide, E. I. du Pont de Nemours & Co., Inc.
[9] Gentro–1500—SBR rubber, The General Tire & Rubber Company.
[10] Vygen 110—Polyvinyl chloride resin, The General Tire and Rubber Company.
[11] PBNA—Phenyl-beta-naphthylamine, Uniroyal Ltd.
[12] Santocure—N-cyclohexyl - 2 - benzothiazolesulfenamide, Monsanto Co.

TABLE 6

| | Parts based on— | A | B | C | D | E | F | G | H |
|---|---|---|---|---|---|---|---|---|---|
| Ingredients: | | | | | | | | | |
| Nordel 1040 [5] | Volume | 50 | 50 | 50 | 50 | 50 | 50 | 50 | 50 |
| Vygen 110 [10] | do | 50 | 50 | 50 | 50 | 50 | 50 | 50 | 50 |
| Hi-Sil 233 [16] | do | 0 | 5 | 10 | 15 | 0 | 5 | 10 | 15 |
| Sulfur | Weight | | | | | 0.13 | 0.13 | 0.13 | 0.13 |
| MBT [13] | do | | | | | 0.42 | 0.42 | 0.42 | 0.42 |
| Methyl tuads [15] | do | | | | | 0.34 | 0.34 | 0.34 | 0.34 |
| Property: Tensile strength (p.s.i.) | | 150 | 404 | 548 | 615 | 686 | 904 | 1,112 | 1,178 |

NOTE: See footnotes in col. 12.

This examples shows the increase in physical properties brought about by the use of finely divided reinforcing particulate material, according to the teachings of this invention, in both the cured and uncured state.

EXAMPLE 7

EPDM rubber (Nordel 1042)[5], finely divided reinforcing silica (Hi-Sil)[16], and different (volume) amounts of polyvinyl chloride resin (Vygen 110)[10] were fluxed into blends (samples) A through F shown below in Table 7. The blends were prepared in the same manner as in Example 6. The same curing system and cure as in Example 6 was applied to all the blends. The tensile strength of each blend was then measured. The ingredients and tensile strengths are shown below in Table 7.

[13] MBT—2-mercaptobenzothiazole, E. I. du Pont de Nemours & Co., Inc.
[14] Thionex—Tetramethylthiuram monosulfide, E. I. du Pont de Nemours & Co., Inc.
[15] Methyl tuads—Tetramethylthiuram-disulfide, R. T. Vanderbilt Co., Inc.
[16] Hi-Sil 233—Precipitated hydrated silica, PPG Industries.

What is claimed is:

1. A method of making a stable blend of an elastomer and an incompatible thermoplastic, wherein there is no more than 50 percent by weight thermoplastic and wherein such incompatibility would normally render said blend unstable so that it would show phase separation or display poor physical properties when processed below its fluxing temperature, said incompatible thermoplastic being selected from the group consisting of polyvinyl chloride, nylon and polypropylene, said method comprising

TABLE 7

| | Parts based on— | A | B | C | D | E | F | G | H | I | J | K | L |
|---|---|---|---|---|---|---|---|---|---|---|---|---|---|
| Ingredients: | | | | | | | | | | | | | |
| Nordel 1042 [5] | Volume | 100 | 90 | 80 | 70 | 60 | 50 | 100 | 90 | 80 | 70 | 60 | 50 |
| Vygen 110 [10] | do | 0 | 10 | 20 | 30 | 40 | 50 | 0 | 10 | 20 | 30 | 40 | 50 |
| Hi-Sil 233 [16] | do | 5 | 5 | 5 | 5 | 5 | 5 | | | | | | |
| Sulfur | Weight | 0.13 | 0.13 | 0.13 | 0.13 | 0.13 | 0.13 | 0.13 | 0.13 | 0.13 | 0.13 | 0.13 | 0.13 |
| MBT [13] | do | 0.42 | 0.42 | 0.42 | 0.42 | 0.42 | 0.42 | 0.42 | 0.42 | 0.42 | 0.42 | 0.42 | 0.42 |
| Methyl tuads [15] | do | 0.34 | 0.34 | 0.34 | 0.34 | 0.34 | 0.34 | 0.34 | 0.34 | 0.34 | 0.34 | 0.34 | 0.34 |
| Property: Tensile strength | | 250 | 325 | | 450 | 600 | 925 | 120 | 145 | 200 | 200 | | 325 |

NOTE: See footnotes in col. 12.

The following feature of this invention may be noted from an observation of the reported physical properties:

A tan EPDM/PVC ratio of 100/0 (in other words, pure EPDM), the inclusion of 5 parts (by volume) of silica (filler) increases the tensile strength of the cured blend from 120 p.s.i. to 250 p.s.i. or by about 208%. Applying this 208% increase to each EPDM/PVC blend, without silica, should give the tensile strength of the blends containing silica. For instance, at an EPDM/PVC ratio of 90/10 the non-silica containing blend has a reported tensile strength of 145 p.s.i. Increasing this by 208% gives a theoretical EPDM/PVC/silica tensile strength of 303 p.s.i. However, the reported tensile strength of that blend is 325 p.s.i. (sample B) which indicates a synergistic influxing said elastomer, said incompatible thermoplastic, and from about 3 to about 50 parts per 100 parts by weight of said elastomer of a finely divided reinforcing particulate filler at a temperature above the softening point of said thermoplastic and below the degradation temperature of said elastomer and said thermoplastic, said filler being selected from the group consisting of reinforcing carbon blacks, reinforcing silicas, reinforcing silicates, and mixtures thereof.

2. A method as defined in claim 1 wherein said particulate filler comprises a reinforcing carbon black with a surface area from about 70 to about 400 square meters per gram.

3. A method as defined in claim 1 wherein said elastomer is a rubber polymer of a diolefin and said filler comprises a resinforcing carbon black with a surface area from about 105 to about 128 square meters per gram.

4. A method as described in claim 1 wherein said elastomer is polyurethane rubber and said incompatible thermoplastic is polypropylene.

5. A method as described in claim 1 wherein said elastomer is EPDM rubber and said incompatible thermoplastic is nylon.

6. A method as described in claim 1 wherein said elastomer is SBR rubber and said incompatible thermoplastic is polyvinyl chloride.

7. A method as described in claim 1 wherein said elastomer is EPDM rubber and said incompatible thermoplastic is polyvinyl chloride.

8. A method as described in claim 1 wherein said elastomer is butyl rubber and said incompatible thermoplastic is nylon.

References Cited

UNITED STATES PATENTS

| | | | |
|---|---|---|---|
| 3,156,666 | 11/1964 | Pruett | 260—41 A |
| 3,200,056 | 8/1965 | Bond et al. | 260—41.5 R |
| 3,236,914 | 2/1966 | Murdock et al. | 260—890 |
| 3,272,890 | 9/1966 | O'Leary | 260—859 |
| 3,399,155 | 8/1968 | Baer et al. | 260—890 |
| 3,429,948 | 2/1969 | Massoubre | 260—859 |
| 3,454,676 | 7/1969 | Busse | 260—41.5 |

ALLAN LIEBERMAN, Primary Examiner

U.S. Cl. X.R.

260—37 N, 41 A, 41 R, 41.5 A, 41.5 R, 763, 765, 859, 890